United States Patent
Himmel et al.

(10) Patent No.: US 6,898,598 B2
(45) Date of Patent: May 24, 2005

(54) SMART RECEIPT

(75) Inventors: Benjamin Andrew Himmel, Yorktown Heights, NY (US); Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/925,265

(22) Filed: Aug. 9, 2001

(65) Prior Publication Data

US 2003/0033272 A1 Feb. 13, 2003

(51) Int. Cl.$^7$ ............................................. G06F 17/30
(52) U.S. Cl. .......................... 707/10; 707/3; 707/103 R; 707/204; 705/5; 705/45
(58) Field of Search ............................... 705/22, 23, 25, 705/28, 37, 39, 40, 44, 51, 52, 64, 67, 70, 80, 1, 2, 10, 11, 14, 26, 27, 30, 35, 17, 21, 45, 5, 16; 707/1, 3, 103, 200, 204, 9, 10; 709/206, 217, 219, 224, 245, 246, 203; 455/419, 456.3; 186/55; 194/217; 235/38, 381

(56) References Cited

U.S. PATENT DOCUMENTS

| | | | |
|---|---|---|---|
| 5,509,071 A | | 4/1996 | Petrie, Jr. et al. ............... 380/4 |
| 5,832,464 A | * | 11/1998 | Houvener et al. ............ 705/45 |
| 5,975,275 A | * | 11/1999 | Keith et al. .................. 194/217 |
| 6,129,274 A | * | 10/2000 | Suzuki ........................ 235/381 |
| 6,327,576 B1 | * | 12/2001 | Ogasawara ................... 705/22 |
| 6,394,341 B1 | * | 5/2002 | Makipaa et al. ............. 235/379 |
| 6,439,345 B1 | * | 8/2002 | Recktenwald et al. ........ 186/55 |
| 6,487,540 B1 | * | 11/2002 | Smith et al. .................. 705/21 |
| 6,577,861 B2 | * | 6/2003 | Ogasawara .................. 455/419 |

FOREIGN PATENT DOCUMENTS

| | | | | |
|---|---|---|---|---|
| EP | 0474360 A2 | | 3/1992 | ............ G07C/9/00 |
| JP | 2001175752 A | * | 6/2001 | ........... G06F/17/60 |
| WO | WO 99/22327 | | 5/1999 | ........... G06F/17/60 |

* cited by examiner

*Primary Examiner*—Shahid Alam
*Assistant Examiner*—Fred Ehichioya
(74) *Attorney, Agent, or Firm*—Duke W. Yee; Mark S. Walker; Cathrine K. Kinslow (57) ABSTRACT

A method, program, and system for processing electronic receipts within a computer network are provided. The present invention comprises creating a customer profile for a user using a Smart Receipt application. When the user purchases items, electronic receipts (smart receipts) are sent from the point of sale to a designated database. The database may be on a credit card company server, the product manufacturer's server, a special cash receipts server, or a central clearing house server. When the customer wants a copy of a receipt, he or she enters search parameters which specify the desired receipt. The search parameters may include item type, date of purchase, and method of purchase. A Smart Receipt object is then initiated, which retrieves the specified electronic receipt from the appropriate database, according to the search parameters. A copy of the retrieved electronic receipt is then downloaded to a client machine (e.g. PDA, PC) designated by the customer profile.

24 Claims, 4 Drawing Sheets

SMART RECEIPT

BACKGROUND OF THE INVENTION

1. Technical Field

The present invention relates generally to computer network environments, and more specifically to the maintenance of receipt information regarding commercial transactions.

2. Description of Related Art

Many merchants now employ Electronic Bill Presentment and Payment (EBPP) which send invoices to customers over the Internet. Customers may then pay bills electronically via Web payment services in which they are enrolled. EBPP thus provides the customer with a personal account of bills payable. EBPP services may also provide links to information and support services that are not available with paper invoices. However, no equivalent service is provided for customer receipts.

Current business processes for Point of Sale (POS) generate a "hard-copy receipt" or "electronic receipt" for the customer for every purchase. This POS process also keeps receipts for the customers, merchants, and credit card companies (assuming the purchase was made with a credit card). Thus, the same receipt information is kept in multiple locations. However, this information is static and cannot be enhanced if additional information is necessary. In addition, customers have no control over the disposition of the receipt or the dissemination of the receipt information to third parties Current approaches also do not provide personal receipt accounts which customers may access.

Therefore, it would be desirable to have an electronic receipt service that enables customers to retrieve their electronic receipts and control the disposition of those receipts.

SUMMARY OF THE INVENTION

The present invention provides a method, program, and system for processing electronic receipts within a computer network. The present invention comprises creating a customer profile for a user using a Smart Receipt application. When the user purchases items, electronic receipts (smart receipts) are sent from the point of sale to a designated database. The database may be on a credit card company server, the product manufacturer's server, a special cash receipts server, or a central clearing house server. When the customer wants a copy of a receipt, he or she enters search parameters which specify the desired receipt. The search parameters may include item type, date of purchase, and method of purchase. A Smart Receipt object is then initiated, which retrieves the specified smart receipt from the appropriate database, according to the search parameters. A copy of the retrieved smart receipt is then downloaded to a client machine (e.g. PDA, PC) designated by the customer profile.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a process for handling electronic receipts in order to avoid duplication of information, and also provides services for the customer in need of additional information about a purchased item.

Figure 1:
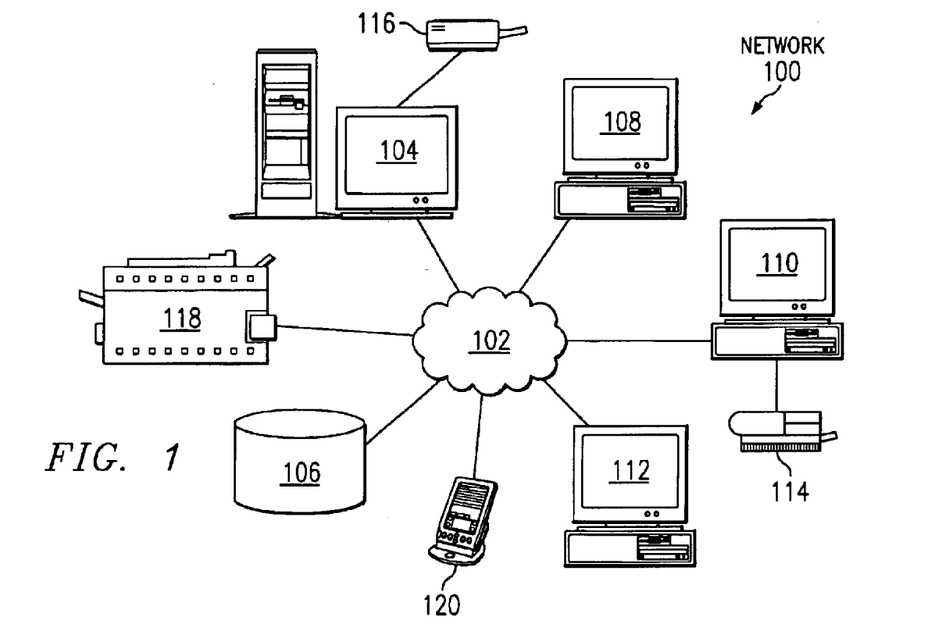
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 also includes PDA 120 and may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
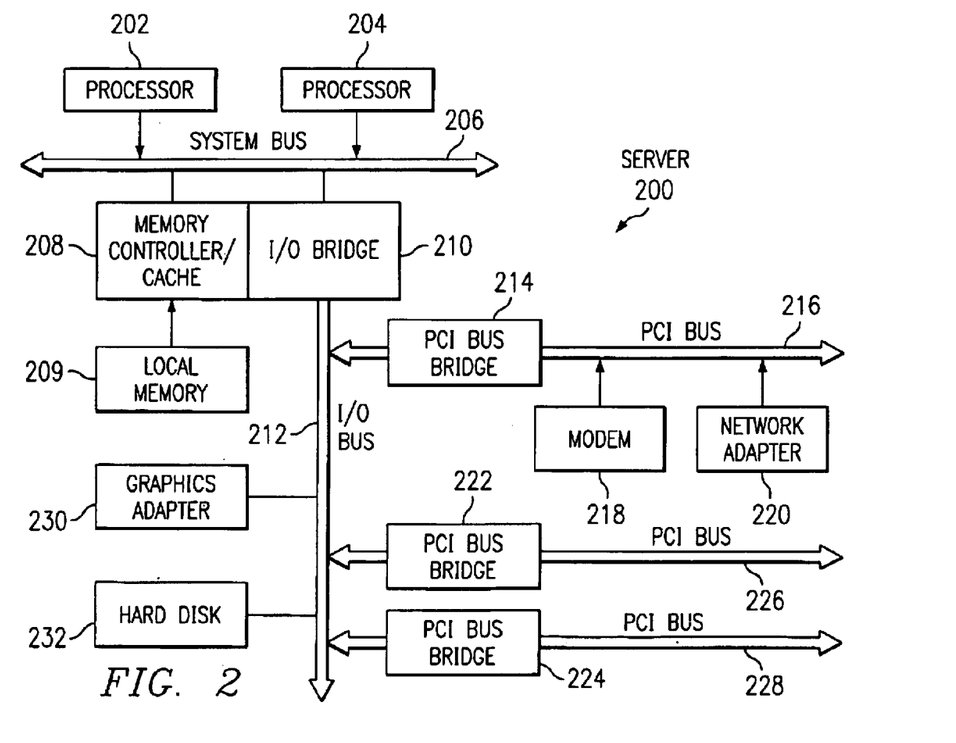
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. Standard components such as a keyboard, mouse and display are not shown in this figure.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
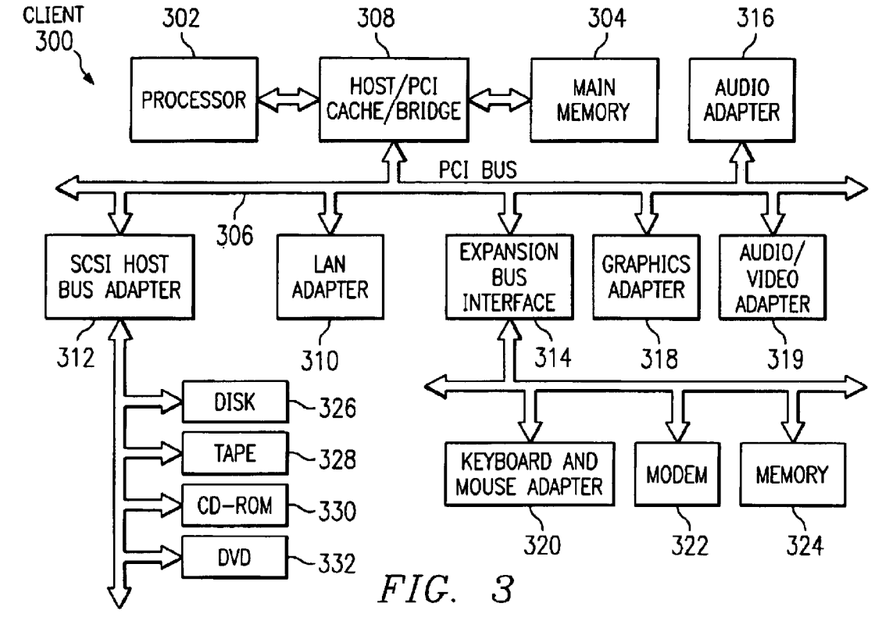
FIG. 3 depicts a block diagram illustrating a data processing system client in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, SCSI host bus adapter 312, and expansion bus interface 314 are connected to PCI local bus 306 by direct component connection. In contrast, local area network (LAN) adapter 310, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
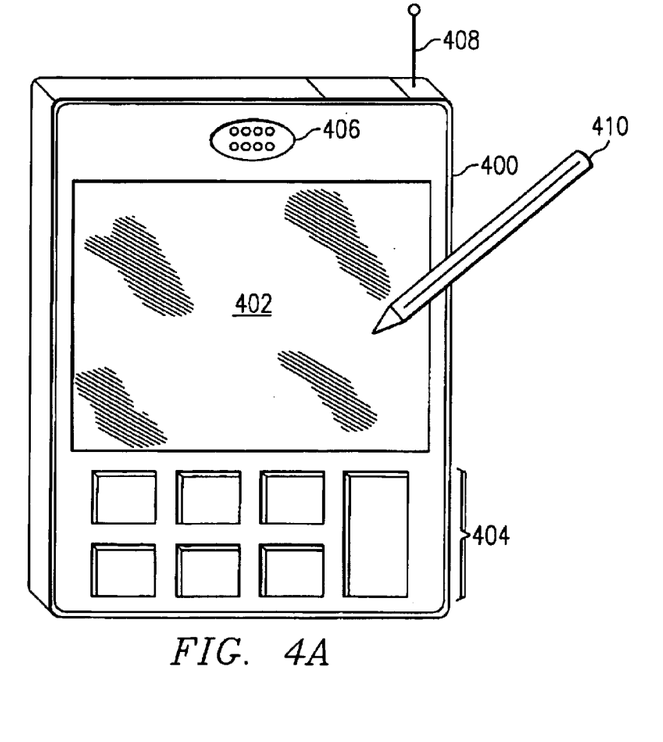
FIG. 4A depicts a diagram of a client in the form of a personal digital assistant (PDA) in accordance with a preferred embodiment of the present invention.

With reference now to FIG. 4A, a diagram of a client in the form of a personal digital assistant (PDA) is depicted in accordance with a preferred embodiment of the present invention. PDA 400 includes a display 402 for presenting textual and graphical information. Display 402 may be a known display device, such as a liquid crystal display (LCD) device. The display may be used to present a map or directions, calendar information, a telephone directory, or an electronic mail message. In these examples, screen 402 may receive user input using an input device such as, for example, stylus 410.

PDA 400 may also include keypad 404, speaker 406, and antenna 408. Keypad 404 may be used to receive user input in addition to using screen 402. Speaker 406 provides a mechanism for audio output, such as presentation of an audio file. Antenna 408 provides a mechanism used in establishing a wireless communications link between PDA 400 and a network, such as network 400 in FIG. 1.

PDA 400 also preferably includes a graphical user interface that may be implemented by means of systems software residing in computer readable media in operation within PDA 400.

Figure 4B:
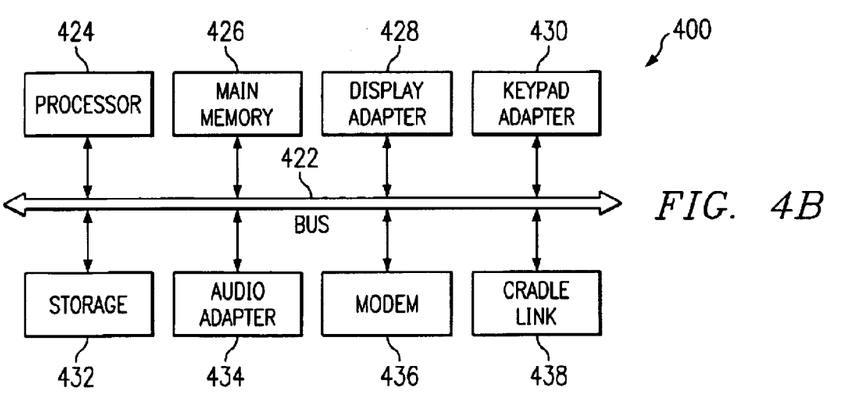
FIG. 4B depicts a block diagram illustrating the hardware configuration of a PDA in accordance with a preferred embodiment of the present invention.

Turning now to FIG. 4B, a block diagram illustrating the hardware configuration of PDA 400 is shown in accordance with a preferred embodiment of the present invention. PDA 400 is an example of a PDA in which code or instructions implementing the processes of the present invention may be located. PDA 400 includes a bus 422 to which processor 424 and main memory 426 are connected. Display adapter 428, keypad adapter 430, storage 432, and audio adapter 434 also are connected to bus 422. Modem 436 provides a mechanism for PDA 400 to communicate with a computer network, such as Network 100. Cradle link 438 provides a mechanism to connect PDA 400 to a cradle used in synchronizing data in PDA 400 with another data processing system. Further, display adapter 428 also includes a mechanism to receive user input from a stylus when a touch screen display is employed.

An operating system runs on processor 424 and is used to coordinate and provide control of various components within PDA 400 in FIG. 4B. The operating system may be, for example, a commercially available operating system such as Palm OS, which is available from Palm Corporation. Instructions for the operating system and applications or programs are located on storage devices, such as storage 432, and may be loaded into main memory 426 for execution by processor 424.

Those of ordinary skill in the art will appreciate that the hardware in FIG. 4B may vary depending on the implementation. Other internal hardware or peripheral devices, such as flash ROM (or equivalent nonvolatile memory) or optical disk drives and the like, may be used in addition to or in place of the hardware depicted in FIG. 4B.

Figure 5:
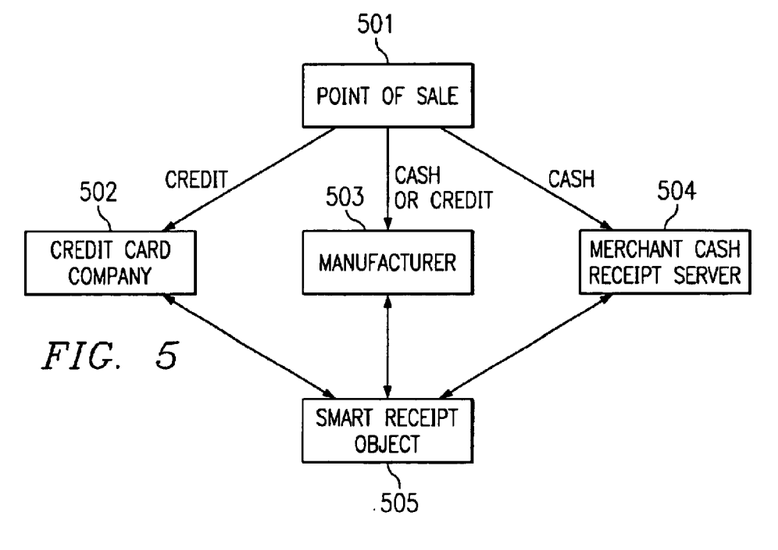
FIG. 5 depicts a schematic diagram illustrating the architecture of the Smart Receipt service in accordance with the present invention.

Referring to FIG. 5, a schematic diagram illustrating the architecture of the Smart Receipt service is depicted in accordance with the present invention. The present invention creates a "Smart Receipt" object 505 resident on the customer's personal computer or PDA. This Smart Receipt object manages access to all of the user's receipts, and eliminates the need to create a "customer copy" of receipts. When a customer makes a purchase, smart receipts (along with user identification data) are sent from the Point of Sale (POS) 501 to various destinations, depending on the method of payment. For example, smart receipts for credit card purchases might be sent to the credit card company server 502 and/or manufacturer server 503. Smart receipts for cash or check purchases can be sent to a cash receipt server 504 or the manufacturer server 503. The cash receipt server may be maintained by a merchant or bank, or used as a safe deposit for the customer.

Maintaining the receipts on the manufacturer and cash receipts servers 503 and 504, facilitates customer service. By using the smart receipts, manufacturers and merchants can maintain and update customer databases much more efficiently than relying on warranty cards or proof of purchase certificates mailed in by customers after a purchase. The database of smart receipts, combined with customer identification data stored with the receipts, allows merchants and manufacturers to offer additional services, such as extended warranties, product upgrades, product recalls, as well as other services related to product safety and quality control. Thus, the Smart Receipt service might make a merchant, credit card company, or manufacturer more attractive to customers.

By using the Smart Receipt service, a customer can make purchases without having to worry about keeping or storing receipts. At the time of purchase, the user would have the option of providing a number/code for categorizing the purchase. For example, the purchase might be for personal, business or educational purposes. When the customer needs the receipt at a later date, the customer uses the Smart Receipt object 505 to obtain the receipt from the appropriate location. For example, if the customer is experiencing problems with a refrigerator that was purchased six months earlier, the customer would use the Smart Receipt object 505 to obtain the smart receipt by entering search criteria such as: item type, brand name, approximate date of purchase, method of purchase (i.e. cash or credit), and a price range. The Smart Receipt object 505 uses this search criteria and the customer's identity, to access the customer's credit card and cash purchase records, which are stored at the appropriate location. After the Smart Receipt object 505 obtains the desired smart receipt, it can make additional requests on behalf of the customer. Continuing the above example, the Smart Receipt object 505 might contact the refrigerator manufacturer to obtain information about the warranty on the refrigerator. This may be accomplished by contacting a manufacturer web site or server. As another example, the Smart Receipt can also be configured to obtain receipts which may be used for tax deduction purposes.

The smart receipts are encrypted and cannot be modified by the customer/user, thus ensuring their authenticity for such purposes as proof of purchase and tax deductions. However, it should be emphasized that the receipts are owned by the customer, not the merchants, manufacturers, or credit card companies. Therefore, the customer controls where the receipts are stored and when they can be accessed. With conventional receipts, merchants or credit card companies may give the receipt information to third parties which may use the information for mailing lists or other marketing uses. Though customers can request that their receipt information not be sent to third parties, this is an extra step that customers must take, and often do not. By contrast, with the present invention, the customer owns the smart receipts and controls how and if the receipt information is disseminated. Therefore, the present invention provides security and privacy that conventional sales receipts do not. Moreover, the customer can set the Smart Receipt object to automatically inform merchants, manufacturers, or credit card companies not send the receipt information to third parties.

Figure 6:
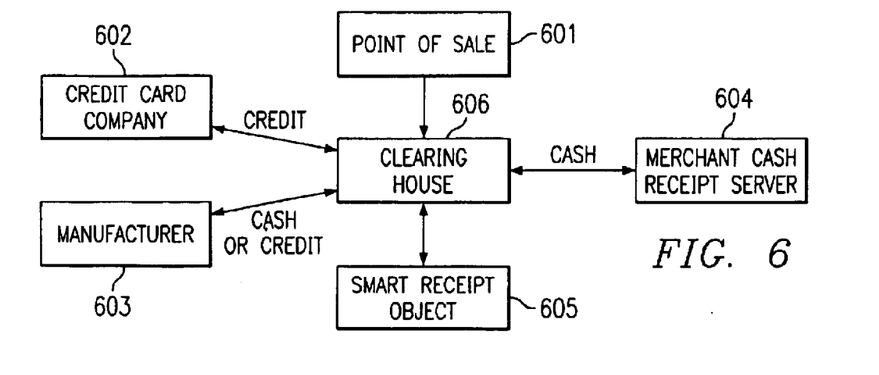
FIG. 6 depicts a schematic diagram illustrating a Smart Receipt clearing house service in accordance with the present invention.

Referring to FIG. 6, a schematic diagram illustrating a Smart Receipt clearing house service is depicted in accordance with the present invention. The architecture illustrated in FIG. 6 is equivalent to that of FIG. 5. However, FIG. 6 also includes a central receipt clearing house 606. The clearing house 606 provides a central location for filing smart receipts from POS 601 and retrieving the receipts via Smart Receipt object 605.

The architecture in FIG. 5 requires the POS 501 and Smart Receipt object 505 to directly contact each separate receipt repository 502, 503, and 504. By contrast, the FIG. 6 architecture allows all receipt storage and retrieval to occur at a central location, clearing house 606, thus simplifying communications and record keeping.

The clearing house architecture also provides the customer with an extra degree of control and privacy. As stated above in reference to FIG. 5, the customer owns the smart receipts and may set the Smart Receipt object to automatically request that receipt information not be sent to third parties. In addition, if the customer does not want the smart receipts to be stored by the merchants or credit card companies at all, the customer can request that the receipts be sent from the POS to a clearing house account. In this way the merchant, manufacturer, bank, or credit card company is not authorized to place the receipt in its own database. Instead, the customer maintains complete control. The request to send smart receipts to a clearing house may be entered by the customer during a purchase or may be preset as a preference in the Smart Receipt object, which would automatically send the request every time a purchase is made.

Figure 7:
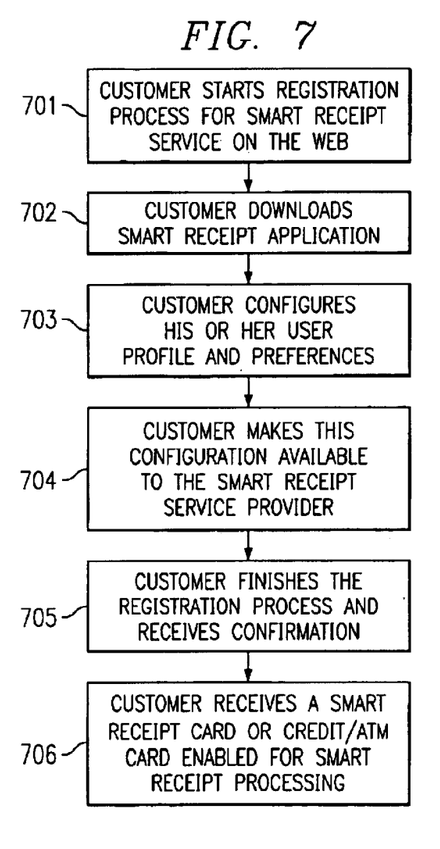
FIG. 7 depicts a flowchart illustrating the process of configuring a user profile for the Smart Receipt service in accordance with the present invention.

Referring to FIG. 7, a flowchart illustrating the process of configuring a user profile for the Smart Receipt service is depicted in accordance with the present invention. The customer begins by starting the registration process on the Smart Receipt service web site (step 701). The customer downloads a Smart Receipt application (step 702) and configures his or her user profile and preferences (step 703). The customer profile contains personal identification information such as name and password. In addition, credit card numbers, purchase classifications (e.g. business, personal, educational), information related to tax deductions, and other personal/financial information might be included in the customer profile. The customer profile might also include which Personal Financial Manager (PFM) is used. Examples of commonly used PFMs are Quicken and Money. The Smart Receipt application can use the PFM on a client machine to provide the user with a local up-to-date account of previous purchases and receipts.

The customer then sends the configuration profile back to the Smart Receipt service provider (step 704). The customer finishes the registration process and receives confirmation from the service provider (step 705). The customer then receives a Smart Receipt card or Credit/ATM card which is enabled for Smart Receipt processing (step 706). The Smart Receipt card is used for cash or check purchases. Whereas a credit or ATM card can be electronically enabled to provide a customer profile during a purchase (i.e. when the card is swiped through a reader), paper cash and checks do not have this capability. Therefore, a Smart Receipt card may be used (swiped) during a cash/check purchase in order to provide the customer profile, which the Smart Receipt service requires in order send the smart receipt to the proper account and cash receipt server, such as servers 504 and 604.

Figure 8:
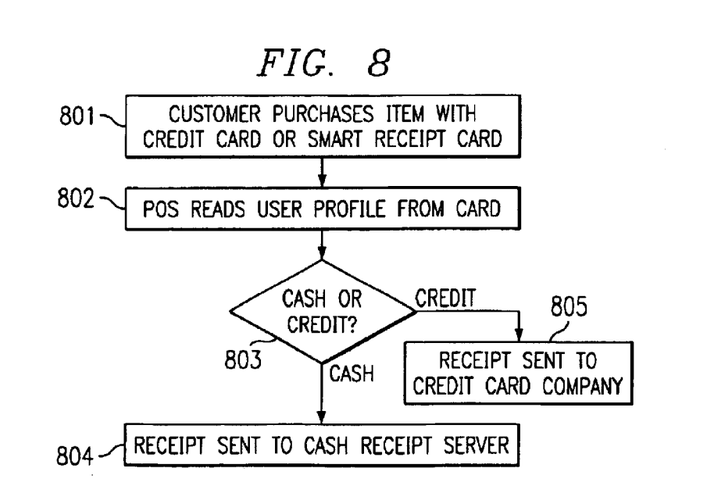
FIG. 8 depicts a flowchart illustrating the Smart Receipt purchasing process in accordance with the present invention.

Referring now to FIG. 8, a flowchart illustrating the Smart Receipt purchasing process is depicted in accordance with the present invention. When using the Smart Receipt service, the customer makes a purchase with a Smart Receipt-enabled credit card or a Smart Receipt card for cash/check purchases (step 801). The when the card is swiped by the merchant, the POS system reads the user profile from the card or retrieves the profile based on a code stored on the card (step 802). As an alternative to reading the profile off a card, the POS system may provide a menu for the customer to provide the necessary information. The Smart Receipt system will route the smart receipt to the proper destination, after determining the method of payment and user profile (step 803). If the customer uses cash or check, the smart receipt is sent to the Cash Receipt Services server (step 804). Optionally, the receipt information may also be sent to a manufacturer server, as explained above. If the customer uses a credit card, the smart receipt is sent to the credit card company (and/or manufacturer) (step 805). Steps 803, 804, and 805 assume that the Smart Receipt service is using the architecture depicted in FIG. 5. If the FIG. 6 architecture is used, all receipt information would be sent directly to a clearing house server.

Figure 9:
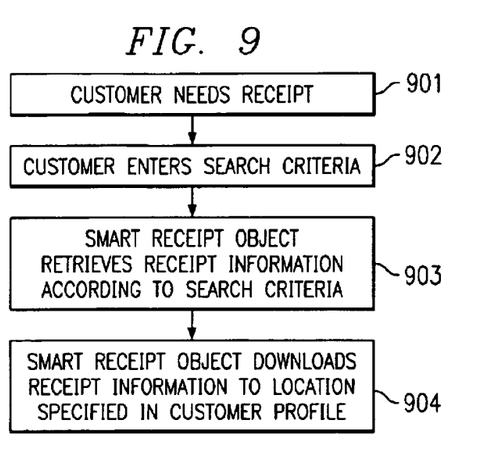
FIG. 9 depicts a flowchart illustrating the Smart Receipt search process in accordance with the present invention.

Referring now to FIG. 9, a flowchart illustrating the Smart Receipt search process is depicted in accordance with the present invention. At a later time, the customer may need to retrieve a smart receipt (step 901). For example, the customer may need the receipt for warranty purposes or tax deductions. The customer enters search criteria such as item type, brand, alternative or substitute items, approximate date of purchase, and method of payment (step 902). In addition to search criteria, the customer can also indicate whether additional information about the item is desired. Examples of additional information include warranty, identical items available for exchange, alternative items available for exchange, customer alerts on product safety, and product updates.

The Smart Receipt object uses the search criteria to locate the desired receipt (and any additional product information) (step 903). The search criteria will also allow the Smart Receipt object to determine from which location to retrieve the receipt (i.e. cash server or credit card company). Of course, if a clearing house is used, receipts can be retrieved directly from the clearing house. The Smart Receipt object then downloads the information to the desired client machine, based on preferences in the customer profile (step 904). Examples of client machines to which smart receipts may be downloaded include PCs, laptop computers, PDAs, mobile phones, and palm computers.

The customer can request multiple receipts, based upon search criteria or the category code provided at purchase. For example, for tax purposes, customers may need receipts for all purchases related to business. The customer specifies "tax deduction" in the search criteria or customer profile. The Smart Receipt object will then search for the "tax year" desired, and can download the necessary information to a PFM such as Quicken or Money, or to a tax application like TurboTax.

The Smart Receipt object can be used for a variety of functions in addition to retrieving smart receipts from previous purchases. As stated above, the Smart Receipt object can be preset to automatically request that receipts be sent to a clearing house account, to help ensure privacy. As another example, the Smart Receipt object may also be set to automatically register for warranties using information from the customer profile, thereby saving the customer from having to register every time a purchase is made. As stated above, certain receipts may be marked for later tax deductions. This preference may be preset in the Smart Receipt object for specified categories of purchases.

Customers may use the Smart Receipt object to automate their bills. This application may be particularly useful for small businesses which need to maintain extensive records for tax reasons and cost comparisons, but cannot afford expensive accounting services. For example, separate Smart Receipt accounts may be maintained for all employees in the company. The employees may use their accounts to access and organize receipts for expense reports. In turn, company managers may also use these accounts to compare and evaluate the expenses of employees, or for the firm in general.

The Smart Receipt object may also be used for more personal applications. Individuals may use the Smart Receipt object to gather receipts for personal tax deductions, or to compare similar purchases made from different merchants. As another example, after completing a purchase, but before leaving the store, the customer may retrieve a receipt using his or her PDA and compare the items on the receipt with items on a shopping list. In this way, the customer could perform a last minute check to make sure nothing was forgotten from the list.

To prevent receipt databases from becoming too cluttered, customers can delete unnecessary receipts using the Smart Receipt object. The customer may request the Smart Receipt object to delete specified receipts or set the Smart Receipt object to automatically delete receipts, based on criteria in the customer profile. For example, the Smart Receipt object might delete a receipt after the warranty for that item has expired.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing an electronic document within a computer network, the method comprising:
    creating a customer profile for a user;
    setting a user preference in a customer profile, wherein the user preference specifies one or more databases, out of a plurality of databases, to which an electronic receipt is to be sent from point of sale devices;
    creating an electronic receipt containing information about a transaction executed by the user at a point of sale device; and
    sending the electronic receipt from the point of sale device to the one or more databases specified by the user preference.

2. The method according to claim 1, further comprising:
    receiving search parameters from the user, wherein the search parameters specify an electronic receipt within the one or more databases specified by the user preference;
    initiating a receipt search object which retrieves the specified electronic receipt from the one or more databases specified by the user preference, according to the search parameters; and
    downloading a copy of the retrieved electronic receipt to a client machine designated by the customer profile.

3. The method according to claim 1, wherein the customer profile comprises at least one of the following:
    customer name;
    password;
    credit card numbers;
    client machine addresses;
    tax deduction information;
    purchase classification; and
    personal financial manager applications used on a client machine.

4. The method according to claim 1, wherein the database containing the electronic receipts is on a credit card company server.

5. The method according to claim 1, wherein the database containing the electronic receipts is on a manufacturer server.

6. The method according to claim 1, wherein the database containing the electronic receipts is on a merchant cash receipt server.

7. The method according to claim 1, wherein the database containing the electronic receipts is on a clearing house server.

8. The method according to claim 1, wherein the electronic receipt further comprises at least one of the following:
    customer name;
    customer password;
    item type;
    brand name;
    date of purchase;
    purchase price;
    method of purchase;
    credit card number;
    tax deduction status; and
    warranty information.

9. The method according to claim 1, wherein the search parameters comprise at least one of the following:
    customer name;
    customer password;
    item type;
    brand name;
    approximate date of purchase;
    approximate purchase price;
    method of purchase;
    credit card number; and
    tax deduction status.

10. The method according to claim 1, wherein merchants and manufacturers may use the electronic receipts to send product information to customers, the product information comprising at least one of the following:
    extended warranties;
    product upgrades;
    product recalls;
    product safety updates;
    identical items available for exchange; and
    alternative and substitute items available for exchange.

11. The method according to claim 1, wherein the electronic receipts are encrypted, preventing the information content of the electronic receipts from being modified.

12. The method according to claim 1, wherein the client machine may be at least one of the following:
    personal computer;
    laptop computer;
    personal digital assistant;
    mobile telephone; and
    palm computer.

13. The method according to claim 1, further comprising:
    initiating the receipt search object to delete an electronic receipt from the database, according to the search parameter.

14. The method according to claim 1, further comprising:
  initiating the receipt search object to automatically delete an electronic receipt from the database at a predefined time.

15. A computer program product in a computer readable medium for use in a data processing system, for managing an electronic document within a computer network, the computer program product comprising:
  instructions for creating a customer profile for a user;
  instructions for setting a user preference in a customer profile, wherein the user preference specifies one or more databases, out of a plurality of databases, to which an electronic receipt is to be sent from point of sale devices;
  instructions for creating an electronic receipt containing information about a transaction executed by the user at a point of sale device; and
  instructions for sending the electronic receipt from the point of sale device to the one or more databases specified by the user preference.

16. The computer program product according to claim 15, further comprising:
  instructions for receiving search parameters from the user, wherein the search parameters specify an electronic receipt within the one or more databases specified by the user preference;
  instructions for initiating a receipt search object which retrieves the specified electronic receipt from the one or more databases specified by the user preference, according to the search parameters; and
  instructions for downloading a copy of the retrieved electronic receipt to a client machine designated by the customer profile.

17. The computer program product according to claim 15, wherein the customer profile comprises at least one of the following:
  customer name;
  password;
  credit card numbers;
  client machine addresses;
  tax deduction information;
  purchase classification; and
  personal financial manager applications used on a client machine.

18. The computer program product according to claim 15, wherein the electronic receipt further comprises at least one of the following:
  customer name;
  customer password;
  item type;
  brand name;
  date of purchase;
  purchase price;
  method of purchase;
  credit card number;
  tax deduction status; and
  warranty information.

19. The computer program product according to claim 15, wherein the search parameters comprise at least one of the following:
  customer name;
  customer password;
  item type;
  brand name;
  approximate date of purchase;
  approximate purchase price;
  method of purchase;
  credit card number; and
  tax deduction status.

20. The computer program product according to claim 15, wherein the electronic receipts are encrypted, preventing the information content of the electronic receipts from being modified.

21. The computer program product according to claim 15, further comprising:
  instructions for initiating the receipt search object to delete an electronic receipt from the database, according to the search parameter.

22. The computer program product according to claim 15, further comprising:
  instructions for initiating the receipt search object to automatically delete an electronic receipt from the database at a predefined time.

23. A system for managing an electronic document within a computer network, the system comprising:
  a storage component which contains a customer profile for a user;
  an input component for setting a user preference in a customer profile, wherein the user preference specifies one or more databases, out of a plurality of databases, to which an electronic receipt is to be sent from point of sale devices;
  a processing component which creates an electronic receipt containing information about a transaction executed by the user at a point of sale device; and
  a communication component which sends the electronic receipt from the point of sale device to the one or more databases specified by the user preference.

24. The system according to claim 23, further comprising:
  an input component which receives search parameters from the user, wherein the search parameters specify an electronic receipt within the one or more databases specified by the user preference;
  a processing component which initiates a receipt search object to retrieve the specified electronic receipt from the one or more databases specified by the user preference, according to the search parameters; and
  a downloading component which downloads a copy of the retrieved electronic receipt to a client machine designated by the customer profile.

* * * * *